US012427628B2

(12) United States Patent
Lopez Garcia

(10) Patent No.: US 12,427,628 B2
(45) Date of Patent: Sep. 30, 2025

(54) DOOR JIG PRESS

(71) Applicant: TOYOTA MOTOR ENGINEERING & MANUFACTURING NORTH AMERICA, INC., Plano, TX (US)

(72) Inventor: Jesus Adrian Lopez Garcia, Tijuana (MX)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 328 days.

(21) Appl. No.: 18/318,518

(22) Filed: May 16, 2023

(65) Prior Publication Data

US 2024/0383109 A1    Nov. 21, 2024

(51) Int. Cl.
*B25B 11/02* (2006.01)
*B30B 9/04* (2006.01)
*B30B 13/00* (2006.01)
*B62D 65/06* (2006.01)

(52) U.S. Cl.
CPC ............. *B25B 11/02* (2013.01); *B30B 9/04* (2013.01); *B30B 13/00* (2013.01); *B62D 65/06* (2013.01)

(58) Field of Classification Search
CPC ........... B25B 11/00; B25B 11/02; B25H 7/02; B30B 12/00; B30B 13/00; B30B 15/04; B30B 15/041; B30B 15/047; B30B 15/045; B62D 65/06; Y10T 29/53678; Y10T 29/53826
See application file for complete search history.

(56) References Cited

U.S. PATENT DOCUMENTS

| 4,137,840 A * | 2/1979 | Kubota ................. B30B 15/047 100/282 |
| 6,453,718 B1 * | 9/2002 | Schmeink ............. B21D 43/05 100/207 |
| 7,384,081 B2 * | 6/2008 | Shishikura ............ B62D 65/02 293/1 |
| 9,151,088 B2 * | 10/2015 | Mazzei ................. E05B 85/045 |
| 2014/0150677 A1 * | 6/2014 | Zhu .......................... B30B 15/30 100/223 |
| 2016/0039352 A1 * | 2/2016 | Buchman ............... B60R 9/058 224/329 |
| 2016/0167329 A1 * | 6/2016 | Martinez Martinez ...................... B30B 15/04 29/252 |

(Continued)

FOREIGN PATENT DOCUMENTS

CN    209289106 U    8/2019
JP    2550525 Y2    10/1997

(Continued)

*Primary Examiner* — Tyrone V Hall, Jr.
(74) *Attorney, Agent, or Firm* — SHEPPARD, MULLIN, RICHTER & HAMPTON LLP; Daniel N. Yannuzzi

(57) ABSTRACT

Systems and methods are provided for using vehicle door jigs with a door jig press. A vehicle door jig can be inserted into a press, and the press can be activated by simultaneously pressing and holding down two or more actuation mechanisms. The press can tighten one or more hooks of the vehicle door jig by pressing the one or more hooks against a base of the vehicle door jig. Releasing the two or more actuation mechanisms can complete pressing of the vehicle door jig.

10 Claims, 4 Drawing Sheets

(56) References Cited

U.S. PATENT DOCUMENTS

| | | | |
|---|---|---|---|
| 2020/0101514 A1* | 4/2020 | Suzuki | B21D 22/30 |
| 2021/0253190 A1* | 8/2021 | Kelley | B62D 65/04 |
| 2022/0063226 A1* | 3/2022 | Paul | B30B 15/04 |

FOREIGN PATENT DOCUMENTS

| | | | |
|---|---|---|---|
| JP | 2004262278 A | | 9/2004 |
| KR | 200381810 Y1 | | 4/2005 |
| WO | 2010012917 A2 | | 2/2010 |

* cited by examiner

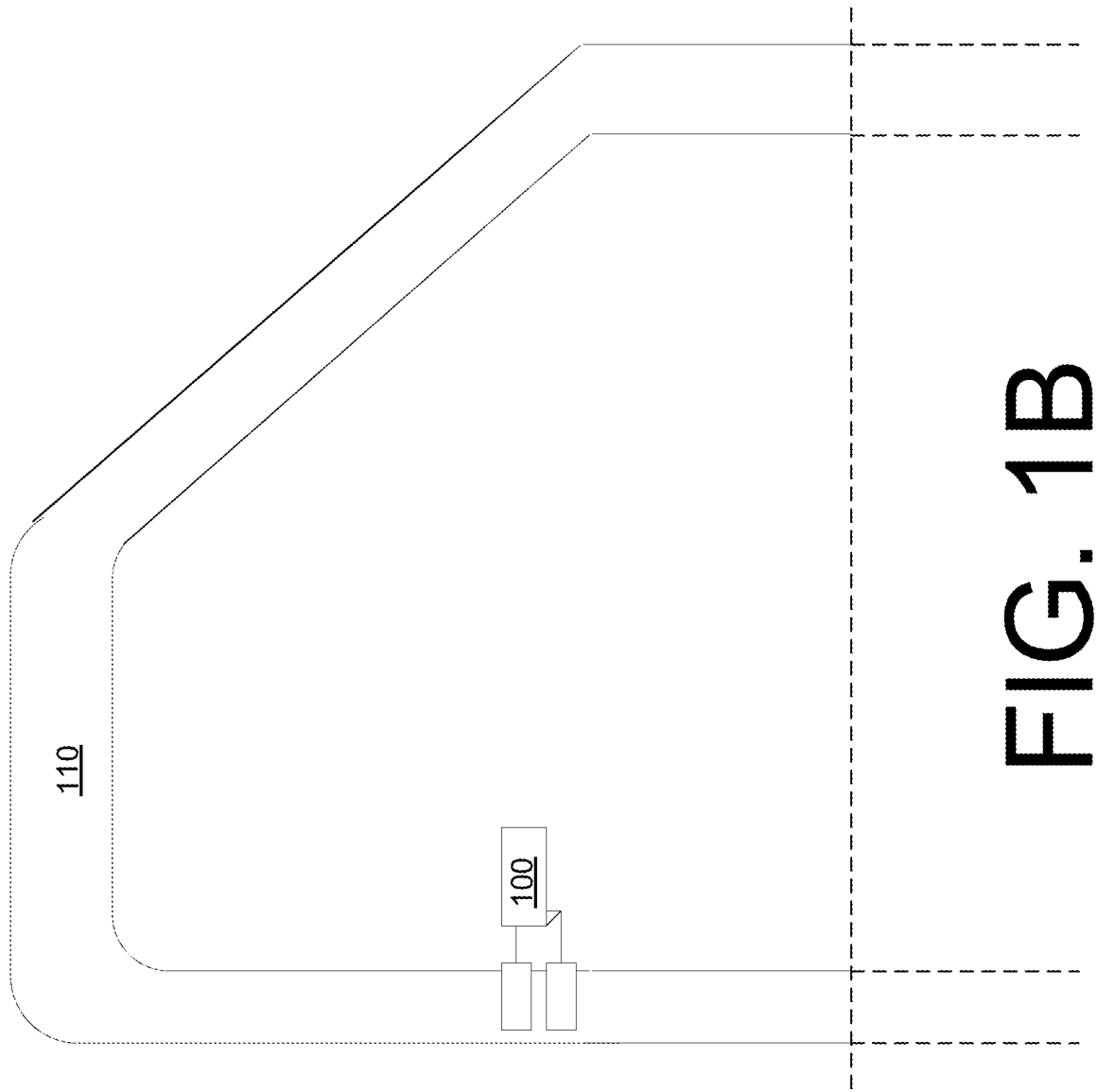

DOOR JIG PRESS

TECHNICAL FIELD

The present disclosure relates generally to door fasteners, and in particular, some implementations may relate to door jigs that can hold vehicle doors to the chassis/door frame during manufacture.

DESCRIPTION OF RELATED ART

Door jigs can be applied to vehicle door frames to hold vehicle doors in place during manufacture. These door jigs are typically single use because each use loosens the fastener such that it cannot hold a door securely.

BRIEF SUMMARY OF THE DISCLOSURE

According to various embodiments of the disclosed technology, a method for reusing vehicle door jigs can comprise inserting a vehicle door jig into a press; activating the press by simultaneously pressing and holding down two or more actuation buttons; tightening one or more hooks of the vehicle door jig by pressing the one or more hooks against a base of the vehicle door jig; and releasing the two or more actuation buttons to complete pressing the vehicle door jig.

In some embodiments, the press can receive a plurality of vehicle door jigs at a time.

In some embodiments, the press can receive a same vehicle door jig up to six times.

In some embodiments, pressing the one or more hooks against the base of the vehicle door jig comprises pressing a metal plate inside the press against the one or more hooks to reduce a width of the one or more hooks.

In some embodiments, upon releasing the two or more actuation buttons, the metal plate removes pressure and lifts away from the vehicle door jig.

According to various embodiments, a door jig press can comprise a base to receive two or more vehicle door jigs; a pressing plate above the base, wherein the pressing plate moves downwards towards the base upon actuation; and two or more actuation buttons, wherein upon pressing the two or more actuation buttons, the pressing plate moves downward to press the two or more vehicle door jigs against the base, and wherein upon releasing the two or more actuation buttons, the pressing plate moves upward to lift away from the two or more vehicle door jigs and the base.

In some embodiments, pressing the two or more vehicle door jigs against the base comprises folding one or more hooks of the two or more vehicle door jigs to reduce a width of the one or more hooks.

In some embodiments, the door jig press further comprises two compartments, wherein each compartment can receive a door jig.

In some embodiments, the two or more vehicle door jigs are inserted partially into the door jig press.

In some embodiments, the two or more actuation buttons are pressed simultaneously to activate the door jig press.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1B illustrates an example door jig as applied to a car frame.

The figures are not exhaustive and do not limit the present disclosure to the precise form disclosed.

DETAILED DESCRIPTION

During the manufacture of automotive vehicles, vehicle doors sometimes need to be secured to the chassis door frame. At some points of manufacture, the vehicle door has not been fastened to the door frame with appropriate locks, hinges, etc. Accordingly, vehicle doors need to be secured to the door frame in other ways until these elements are constructed. Door jigs can be used to secure the vehicle door until the appropriate locking mechanisms are in place. This is accomplished by securing the door jig to the door frame, and holding the vehicle door against the door frame with the door jig. Door jigs can come in various shapes and sizes depending on the vehicle frame, vehicle door, or other manufacture limitations. Door jigs can be made of any material to secure the vehicle door, though they are commonly made of metal. Metal door jigs are typically single use due to the strain involved on the door jig during each use. After each use, the fastening mechanism of the door jig is loosened, meaning that it would not have a tight enough hold upon subsequent use. The use of single use door jigs can result in significant waste given the volume of vehicles manufactured at a time.

To reduce this waste, door jigs can be reused if they are sufficiently tightened to its original shape. Door jigs can be reused up to six times if retightened after each use, which produces significantly less waste than single use door jigs. Door jigs can be retightened manually, though manually retightening a door jig after each use can delay vehicle manufacturing given the number of door jigs used and the strength required to sufficiently retighten a door jig. Various embodiments of the disclosed technology can reduce this delay by tightening multiple door jigs at a time with a corresponding door jig press. This door jig press can receive multiple door jigs and press the fastening mechanisms together to retighten the door jig. This process can occur by user operation of the door jig press with a safety mechanism in place to reduce any risk to an operating user. By pressing the fastening mechanism back to its original shape, the door jig's rigidity can be restored and it can sufficiently secure a vehicle door to the door frame. This process can take seconds, meaning that many door jigs can quickly be retightened for future use. Accordingly, embodiments of the present invention can reduce waste involved with vehicle manufacturing and reduce delays that arise from this reduction of waste.

Figure 1A:
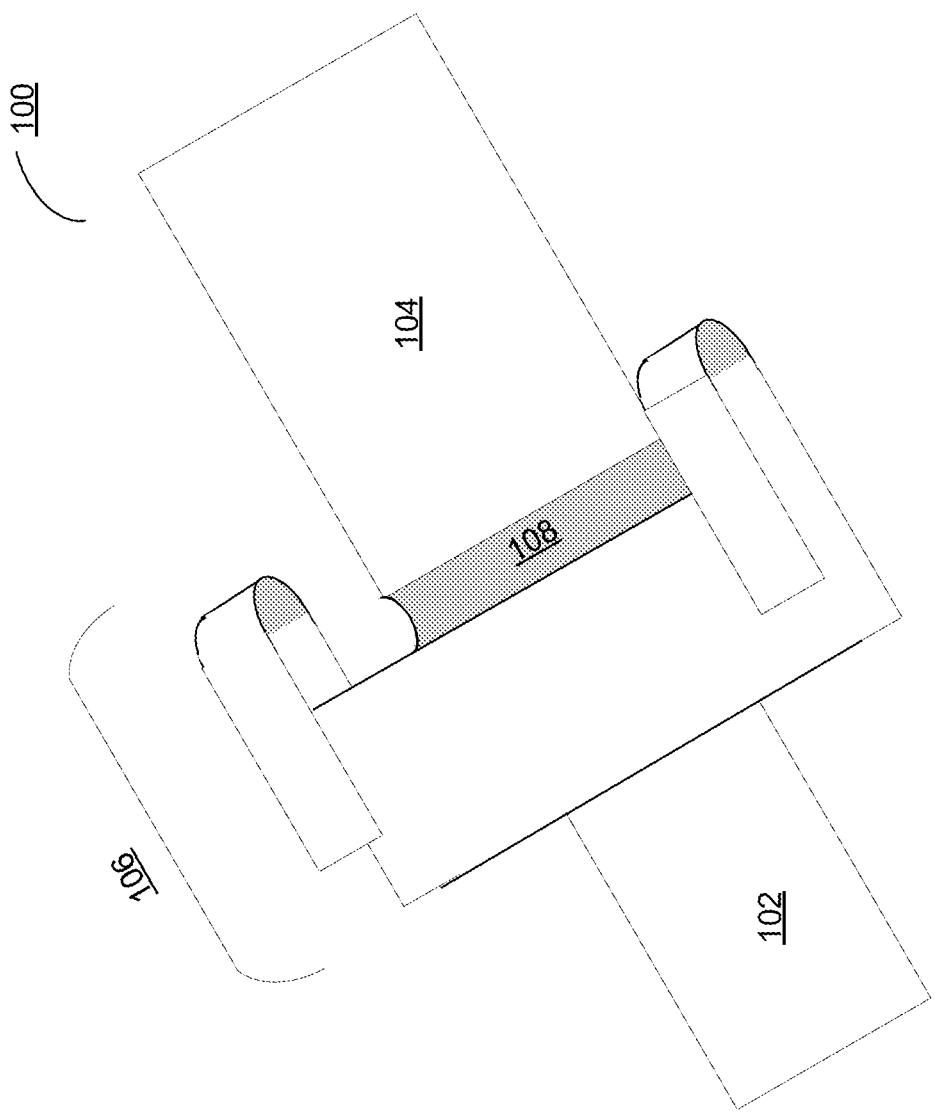
FIG. 1A illustrates an example door jig that may be used in the embodiments described herein.

FIG. 1A illustrates an example door jig that can be inserted into the door jig press. As mentioned above, traditional door jigs can be made of metal to retain enough rigidity to secure a vehicle door. Door jig 100 can comprise a rectangular structure with rectangular ends 102 and 104. Rectangular ends 102 and 104 may be similar or different widths and lengths depending on the vehicle door and door frame. In the middle of door jig 100 is fastening mechanism 106. Fastening mechanism 106 can comprise two hooks on each end of the fastening mechanism. These hooks latch onto the vehicle door frame while the vehicle door is secured to the door frame. The rigidity of door jig 100 holds the vehicle door to the door frame while door jig 100 is in place. In some embodiments, door jig 100 comprises a divet 108 between a rectangular end and fastening mechanism 106. In some embodiments, door jig 100 comprises one or more hooks to form fastening mechanism 106. Door jig 100 can vary in shape and size, such that rectangular ends 102 and 104 can vary in length or width. Rectangular ends 102 and 104 may be curved or flat at the edges, and may be trapezoidal, triangular, circular, or other shapes.

Figure 2:
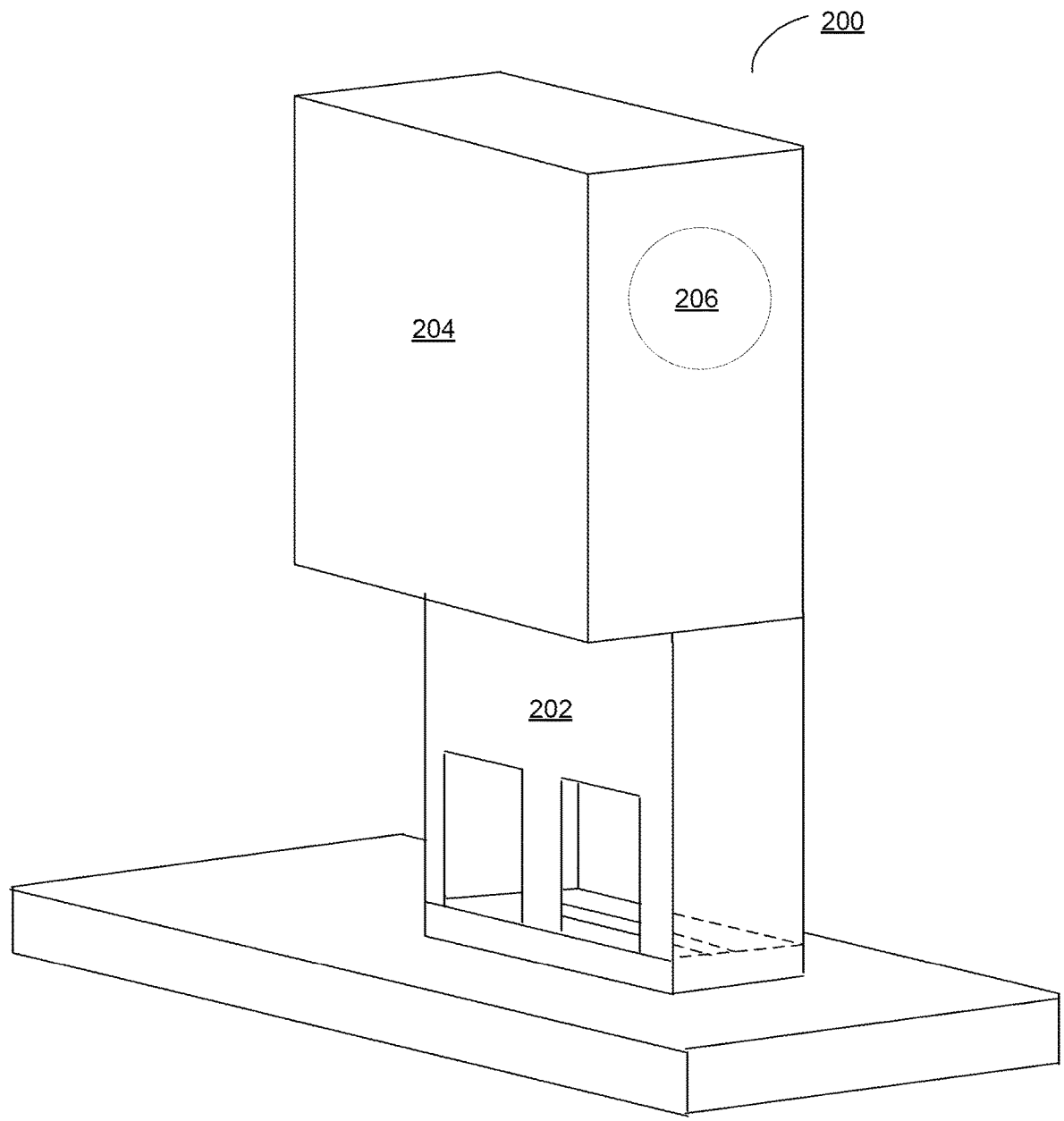
FIG. 2 illustrates an example door jig press in accordance with the embodiments described herein.
Figure 3:
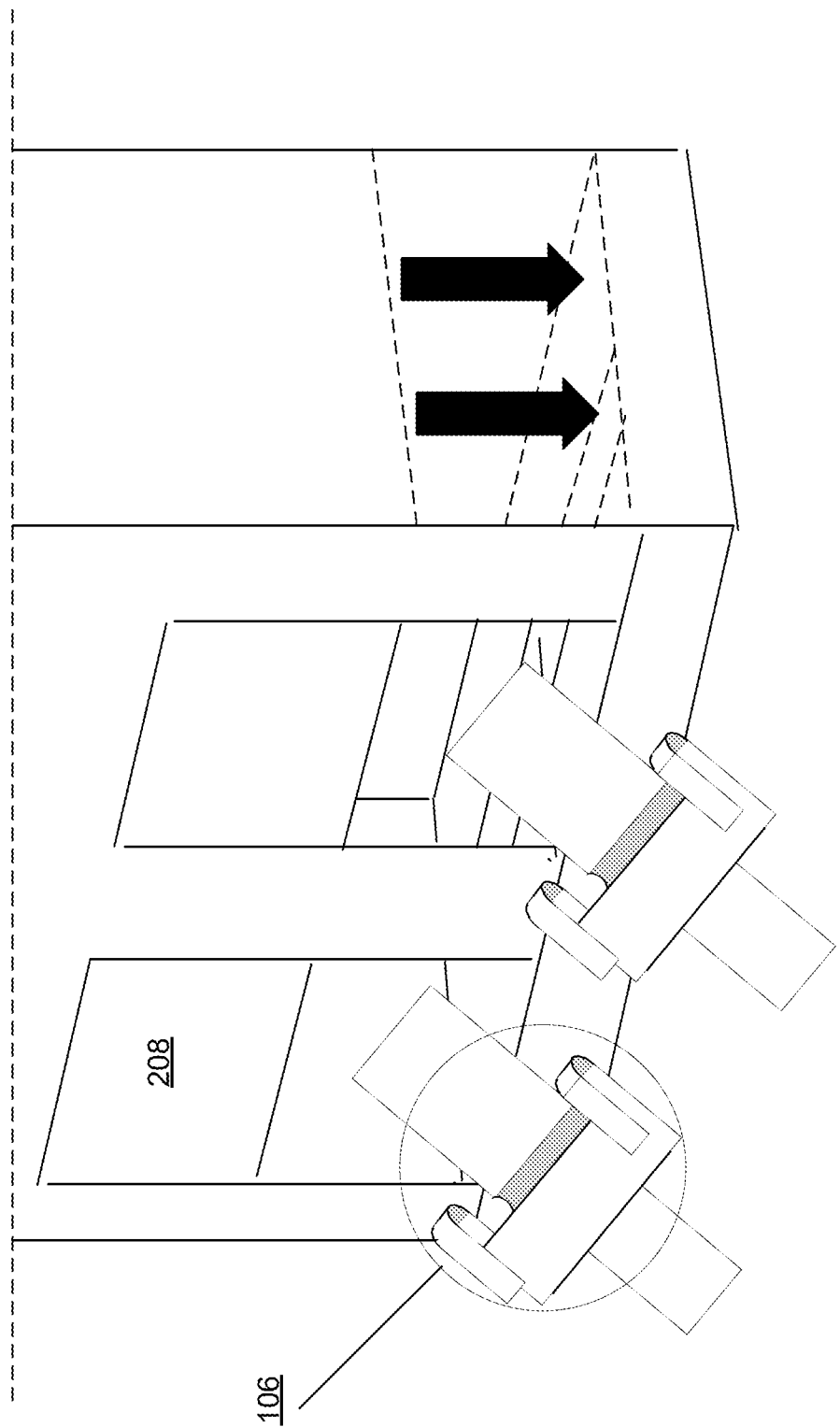
FIG. 3 illustrates an example door jig as it is folded in the door jig press.

FIG. 1B illustrates door jig 100 as it is applied to a vehicle door frame 110. As described above, fastening mechanism 106 can comprise hooks to latch onto the vehicle door frame. These hooks can be visible from the outside of the vehicle door and door frame. Door jig 100 can latch onto door frame 110 and hold a vehicle door in place with rigidity. As the door jig is used, these hooks can widen and loosen, reducing the strength applied to the vehicle door and door frame. To reuse door jig 100, these hooks can be re-tightened by bending the metal back to its original shape. As illustrated in FIGS. 2 and 3, a door jig press can accommodate door jig 100 and retighten the hooks on fastening mechanism 106.

FIG. 2 illustrates an example door jig press 200 in accordance with one embodiment. Door jig press 200 can be placed on any flat surface such as a table, workbench or floor. In some embodiments, repressed door jigs can be stored in a container under door jig press 200. Door jig press 200 can comprise a rectangular base 202 and a rectangular upper portion 204. Upper portion 204 can house a pressing plate that can be lowered into rectangular base 202. Upper portion 204 can also comprise two or more actuation buttons 206. An actuation button can be located on opposite sides of upper portion 204. By placing actuation buttons 206 on opposite sides of upper portion 202, a user can avoid placing their hands into rectangular base 202 while door jig press 200 is activated.

Rectangular base 202 can comprise two or more compartments to receive multiple door jigs. These compartments can vary in size and number depending on how many door jigs are being pressed. A door jig can be inserted into each compartment before activating door jig press 200. In some embodiments, the door jig is only inserted partially such that the fastening mechanism is fully inside the compartment. Actuation buttons 206 can be pressed simultaneously to activate door jig press 200. A user can hold down actuation buttons 206, and release actuation buttons 206 to disengage door jig press 200. Upon activation, the pressing plate can descend downwards from upper portion 204 into the compartments. The pressing plate can descend at various speeds or times depending on how much strength is needed to retighten a door jig. The pressing plate can press against the door jigs and against the bottom of rectangular base 202. This action can reduce or fold the width of the hooks on the fastening mechanism to retighten the door jig. As mentioned above, a door jig can be retightened up to six times if pressed back to its original shape. Upon releasing activation buttons 206, the pressing plate can be lifted upwards away back into upper portion 204, removing pressure from the vehicle door jigs.

FIG. 3 illustrates two example door jigs as they are inserted into door jig press 200. As mentioned above, these door digs can be inserted into corresponding compartments so that fastening mechanism 106 is fully underneath pressing plate 208. Pressing plate 208 can comprise various shapes and sizes. In the example of FIG. 3, pressing plate 208 can comprise a rectangular block. The rectangular block can apply pressure evenly to the door jig so that fastening mechanism 106 is pressed evenly back to its original shape. Pressing plate 208 can be lowered by any mechanism that can apply significant pressure to the door jigs. Pressure can be applied at various speeds and for various lengths of time depending on how much the fastening mechanism needs to be pressed.

In some embodiments, pressing plate 208 can only lower if actuation buttons 206 are pressed and held down. Upon release of actuation buttons 206, pressing plate 208 can rise back up to its original position. Actuation buttons 206 can complete an electrical circuit to lower pressing plate 208. Alternatively, door jig press 200 can be activated hydraulically or mechanically, (i.e. via gravity, pulleys, or other mechanisms). Door jig press 200 can be portable such that it can be moved between locations with relative ease. In the example of FIG. 3, the compartments can accommodate two door jigs. Door jig press 200 can be scaled to accommodate any number of door jigs. For example, a smaller door jig press may accommodate one door jig, while a larger scale can comprise more compartments to accommodate multiple door jigs.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for reusing vehicle door jigs, comprising: inserting a vehicle door jig into a press; activating the press by simultaneously pressing and holding down two or more actuation buttons; tightening one or more hooks of the vehicle door jig by pressing the one or more hooks of the vehicle door jig against a pressing plate and a base of the press; and releasing the two or more actuation buttons to complete pressing the vehicle door jig.

2. The method of claim 1, wherein the press can receive a plurality of vehicle door jigs at a time.

3. The method of claim 1, wherein the press can receive and press the same vehicle door jig up to six times.

4. The method of claim 1, wherein by pressing the one or more hooks of the vehicle door jig a width of the one or more hooks of the vehicle door jig is reduced.

5. The method of claim 4, wherein upon releasing the two or more actuation buttons, the pressing plate removes pressure and lifts away from the vehicle door jig.

6. A system for pressing a vehicle door jig, comprising:
two or more vehicle door jigs;
a vehicle door jig press comprising:
a base to receive the two or more vehicle door jigs;
a pressing plate positioned above the base, wherein the pressing plate moves downwards towards the base upon actuation; and
two or more actuation buttons for actuation of the pressing plate, wherein upon pressing the two or more actuation buttons, the pressing plate moves downward to press the two or more vehicle door jigs against the base, and wherein upon releasing the two or more buttons, the pressing plate moves upward to lift away from the two or more vehicle door jigs and the base.

7. The system of claim 6, wherein the two or more vehicle door jigs comprises one or more hooks and the vehicle door jig press is configured to fold the one or more hooks of the two or more vehicle door jigs to reduce a width of the one or more hooks.

8. The system of claim 6, wherein the vehicle door jig press further comprising two compartments, wherein each compartment can receive the two or more vehicle door jigs.

9. The system of claim 6, wherein the two or more vehicle door jigs further comprising one or more hooks.

10. The system of claim 6, wherein the two or more actuation buttons are pressed simultaneously to activate the door jig press to cause the pressing plate to move downward to press the two or more vehicle door jigs.

* * * * *